April 3, 1945.  A. H. RODECK  2,372,795
METHOD OF MAKING HEAT EXCHANGE DEVICE
Filed Aug. 5, 1942
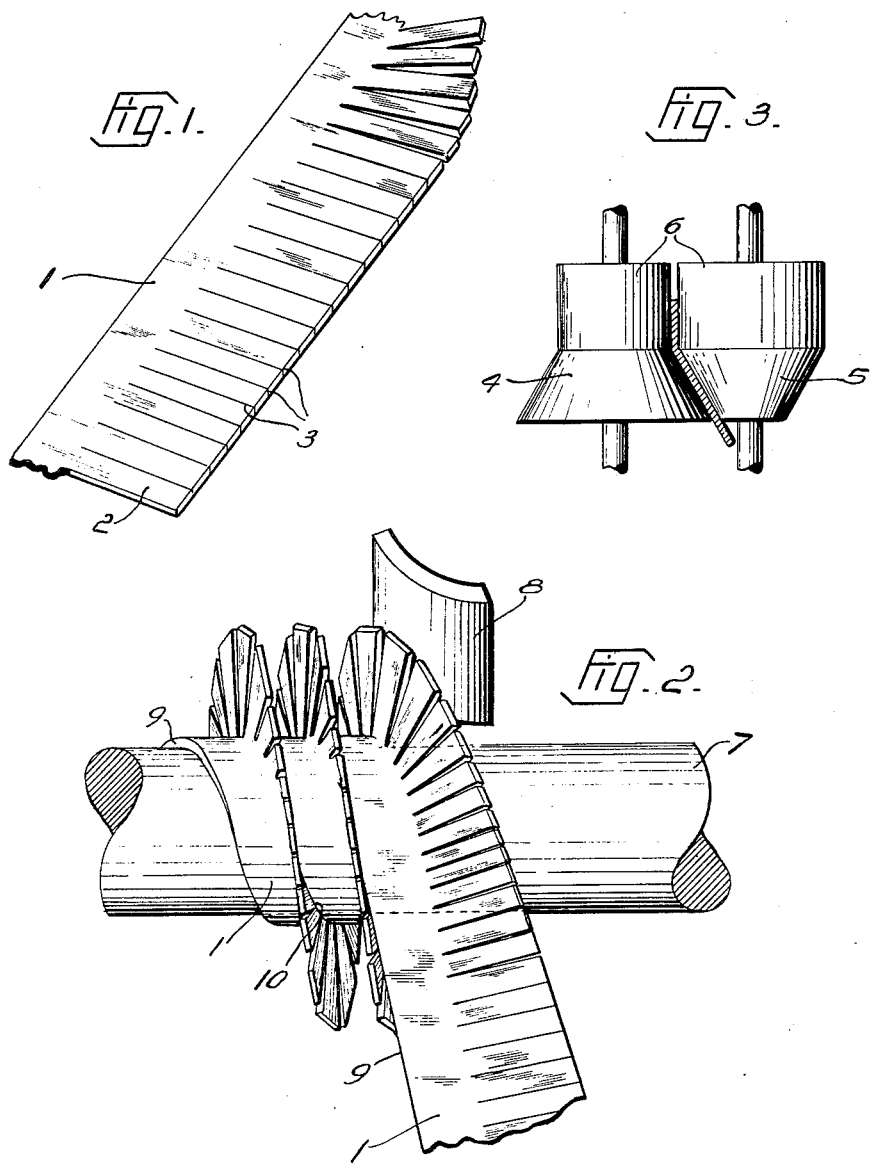
INVENTOR.
Armin H. Rodeck
BY
Attys.

Patented Apr. 3, 1945

2,372,795

UNITED STATES PATENT OFFICE 2,372,795

METHOD OF MAKING HEAT EXCHANGE DEVICES

Armin H. Rodeck, Long Island City, N. Y., assignor to Otto Gutmann, New York, N. Y.

Application August 5, 1942, Serial No. 453,669

1 Claim. (Cl. 113—118)

This invention relates to the manufacture of edgewound coils from flat strips or ribbons of metal in the production of heat exchangers of the finned tube type.

In the production of finned tubes, as hitherto practiced by winding a metal strip around an axis at right angles to its plane it has been customary to wind the strips into edge wound coils on a mandrel and then fix such coils on a tube by soldering brazing or welding. Alternatively the coils have been wound directly on the tube. In either case difficulties were experienced in introducing the solder, the soldering or welding tool through the narrow gap between adjoining coil windings. These difficulties are particularly noticeable if the flange extending at right angle to the coil axis is subdivided by radial slits into juxtaposed tongues.

It is an object of my invention to improve and facilitate the production of edge wound coils and of finned tubes with the spiral flanges subdivided into tongues.

I will now describe an embodiment of my invention, which is shown by way of example in a largely diagrammatic manner in the drawing forming part of this specification.

In the drawing

Fig. 1 is a perspective view of a sheet metal strip with about two-thirds of its width subdivided into tongues.

Fig. 2 shows the way in which a ribbed tube is formed by winding a strip such as shown in Fig. 1 on a rotating shaft.

Fig. 3 shows a pair of bending rolls.

Referring to the drawings and first to Fig. 1, 1 is the undivided part of a sheet metal strip and 2, 2 are a row of tongues formed by parallel cuts 3 extending at right angles to the longitudinal edge. Some of these tongues are shown as being bent at an angle to the strip surface.

In order to form this strip into a ribbed tube according to this invention, it is first passed through between a pair of frusto-conical rolls 4 and 5 (shown in Fig. 3) combined with cylindrical sections 6, the rolls 4 and 5 sloping in opposite direction with their conical surfaces extending in parallel. When the strip is gripped by the rolls 4, 5 with the tongues 2 extending in the gap between them and the plain web 1 between the cylindrical rolls 6, the tongues are bent at an obtuse angle to the web. If the end of the plain part 1 of the strip is then fastened to the circumference of the slowly rotating shaft 7 (Fig. 2), the part 1 will be wound upon the cylinder surface of the shaft. While the strip is thus transformed into a tube, adjoining parts of the web 1, i. e., its free edge 9 and the knee 10 formed between the web and the tongues of an adjoining winding are firmly consolidated into a continuous tube by soldering, brazing or welding them together along the entire helical seam, this operation being gone through, while the tongues still extend at an obtuse angle to the web 1, because when the tongues have been bent further by the tool 8, no room may be left between adjoining windings for the solder or welding rod to enter. The tongues then pass a deflecting tool 8 which now bends same into a position at right angles to the web 1, as shown in Fig. 3 and the closely adjoining windings of the web form the tube proper, while the tongues 2 extend in radial direction away from the tube axis, forming a subdivided coil or fin.

By exerting a strong pull on the plain part of the strip in winding it around the carrier part an intimate contact is established between the parts.

I wish it to be understood that I do not desire to be limited to the details described and illustrated in the drawing, for obvious modifications will occur to a person skilled in the art.

I claim:

In the manufacture of finned tubes for heat exchange by spirally winding a sheet metal strip, slitted along one edge to form juxtaposed tongues extending at right angles to the winding axis, the steps of first bending these tongues at an obtuse angle to the strip body while it is being spirally wound into a tube, then consolidating the free edge of the strip body with the knee between the solid and the slitted parts of the adjoining strip winding, and only thereafter bending the tongues into the position substantially at a right angle to the strip body.

ARMIN H. RODECK.